Oct. 14, 1952 E. JEDRZYKOWSKI 2,613,947
OVERLOAD RELEASE COUPLING
Filed Dec. 6, 1949
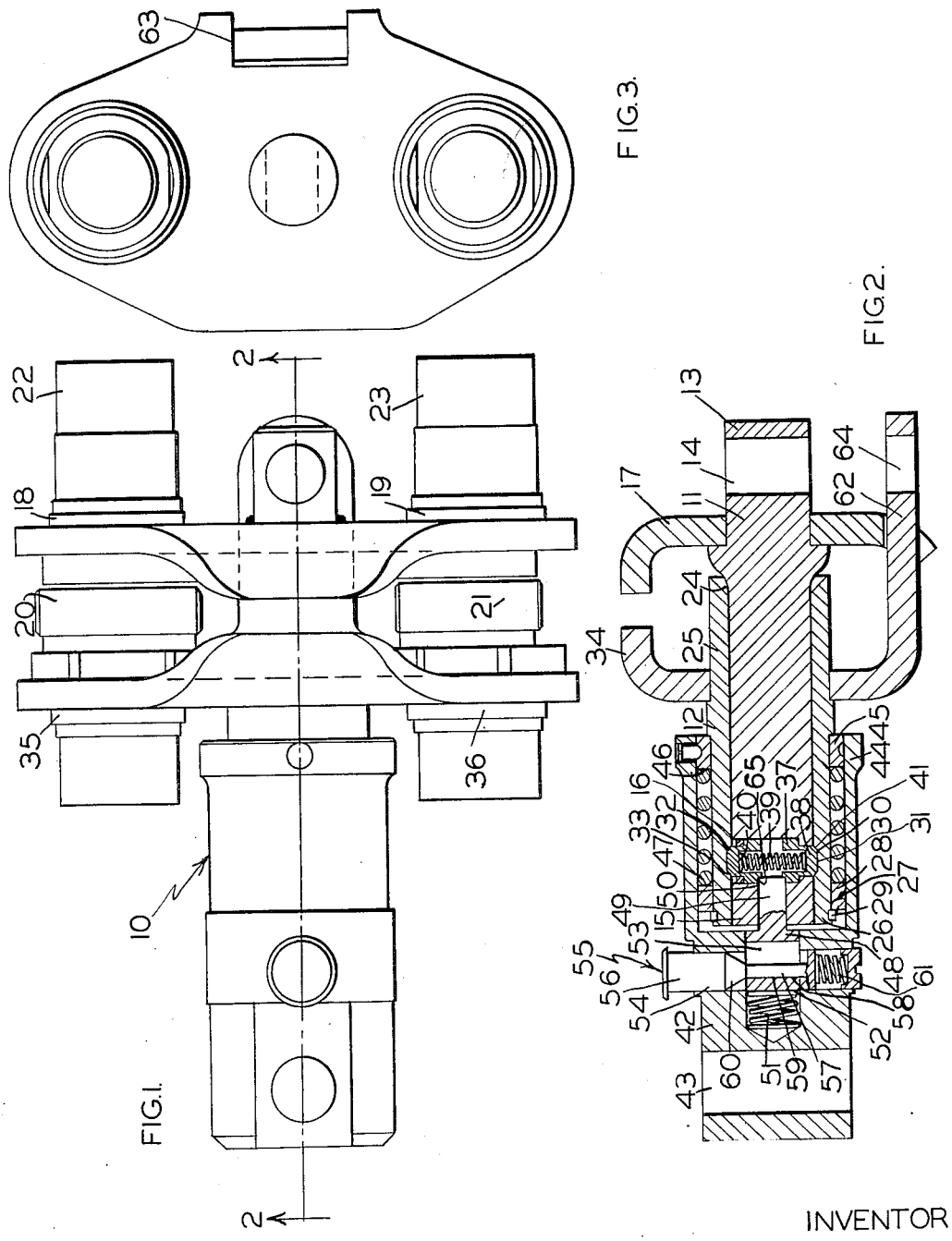
INVENTOR
EDMUND JEDRZYKOWSKI
Paul O. Pippel
ATT'Y Patented Oct. 14, 1952

2,613,947

UNITED STATES PATENT OFFICE 2,613,947

OVERLOAD RELEASE COUPLING

Edmund Jedrzykowski, Chicago, Ill., assignor to International Harvester Company, a corporation of New Jersey Application December 6, 1949, Serial No. 131,403

13 Claims. (Cl. 280—33.16)

This invention relates to a coupling device, and more particularly to a coupling device of the overload release type adapted to connect a trailing vehicle or implement to a source of draft power such as a farm tractor.

Overload release couplings of the general type to which this invention pertains have been used in the past and are still being used in the agricultural field. Couplings of the overload release type are used to connect tractors and plows or other farm implements drawn thereby and are designed to automatically decouple upon the occasion of an abnormal force between the coupled machines. It will be appreciated that the disconnection of the coupled machines must be quickly and readily accomplished when an overloaded condition is reached to prevent breakage of the parts. It is therefore one of the objects of the present invention to provide a new and improved coupling device which will properly connect the farm tractor to the farm implement but will disconnect the machines rapidly when a predetermined load is reached.

A further object is the provision of an overload release coupling device with means for intentionally decoupling the coupling members.

Another object is the provision of a coupling device of the character described which is very strong and otherwise durable, readily and economically manufactured and assembled, and easily handled in its use and operation.

A still further object is to provide a coupling device which requires a minimum amount of physical effort on the part of the farmer to connect a farm tractor and implement.

The foregoing and other important objects and desirable features inherent in and encompassed by the invention together with many of the purposes and uses thereof will become readily apparent from a reading of the ensuing description in conjunction with the annexed drawings in which:

Fig. 1 is a plan view of the new and improved overload release coupling device.

Fig. 2 is a side elevational view taken substantially along line 2—2 of Fig. 1.

Fig. 3 is an end view of the coupling device.

Referring to the drawings in detail wherein like reference characters represent like elements throughout the various views, an overload release coupling device 10 is shown. The coupling device 10 includes a cylindrical male coupling member 11 adapted to be locked or latched to a hollow female coupling member 12 whereby longitudinal forces may be transmitted from one member to the other. The male coupling member 11 has one end 13 provided with a vertically extending aperture 14 for a purpose which will be explained hereinafter. The other end 15 has a plurality of circumferentially spaced radially extending apertures 16 formed therein. The end 15 is further provided with an axial bore 50 which communicates with the apertures 16. A plate-like structure 17 is welded or otherwise rigidly secured to the male coupling member 11 adjacent the aperture 14 to support one of the connecting portions 18, 19 of a pair of self-sealing disconnectable valves 20, 21 for the supply and return lines 22, 23 of the hydraulic or power lift system used on modern tractors for adjusting the trail-behind implements remotely. The male coupling member 11 is connected to a farm implement (not shown) by means of plate 17, connecting portions 18 and 19, and hydraulic lines 22 and 23.

The female coupling member 12 in the present invention takes the form of a hollow cylinder which is designed to slidingly receive a major portion of the male coupling member 11 when the coupling device 10 is in its assembled or connected state. The internal surface 24 of one end 25 of the female member 12 is flared or tapered outwardly to facilitate the insertion of the male member 11 when the members are to be connected together. The other end 26 is provided with an outwardly projecting radial flange 27 which may be formed as an integral part of the female member 12 or as a circular ring member 28 held from longitudinal movement in one direction by a snap ring 29 or other means. Longitudinally spaced from the end 26 is a substantially channel-shaped internal annular recess or groove 30. The recess 30 has a bottom wall 31 and a pair of slightly tapered side walls 32, 33, the purpose of which will be explained hereinafter. Longitudinally inwardly spaced from the end 25 is a plate-like structure 34 similar to structure 17 for supporting the complementary connecting portions 35, 36 of the self-sealing valves 20, 21. It will be appreciated that when the coupling members 11, 12 are in their assembled or coupled relationship the self-sealing valves 20, 21 will also be coupled together. A longitudinally disposed tongue portion 62 of structure 34 extends through a channel-shaped slot 63 of structure 17 and is provided with a vertically extending aperture 64 which is alignable with aperture 13. It will be apparent that a screw driver or like tool may be inserted in aperture 13 to extend into aperture 64 and then swung to the left as viewed in Fig. 2 in order to facilitate the coupling of the coupling device 10 and the valves 20, 21.

Slidably carried in each aperture 16 is a plunger 37 having a head portion 38 adapted to project outwardly from the male member 11 and fit snugly in the recess 30 when the coupling members are connected together. A helical spring 39 transversely disposed within the male member 11 abuts the underside 40 of each plunger 37 to continuously urge them radially and outwardly. It will be noted that the head portion 38 is beveled to provide a surface 41 which abuts the tapered side walls 32, 33 when the coupling members 11, 12 are in the connected relationship. The walls 32, 33 are tapered so that they act as a camming means whenever relative longitudinal movement occurs between the coupling members 11, 12 to depress the plunger 37 into the male member 11 free of the recess 30 against the force exerted by spring 39.

Inasmuch as it is desirable to have the coupling members 11, 12 become disengaged only when a predetermined longitudinal force is applied to the members tending to separate them or when intentionally released, the present invention contemplates the utilization of structure which positively controls the depression or retraction of the plungers 37 caused by the relative movement of the coupling members until the predetermined force or load is reached. The latch controlling means includes a member 42 adapted to slide relatively to the female coupling member 12. The relatively slidable member 42 has a connecting aperture 43 for connection to a farm tractor or other draft means (not shown) and a hollow cylindrical portion 44 adapted to embrace or enclose a portion of the female coupling member 12. Projecting radially inwardly at the open end of the portion 44 is a flange 45, the interior annular surface of which is designed for sliding engagement with the exterior surface of the female coupling member 12. The inwardly facing surface 46 is utilized as an abutting surface for one end of a relatively strong helical spring 47 interposed between the relatively slidable member 42 and the female coupling member 12. The opposite end of the spring 47 bears on the flange 27. It will be apparent that the spring 47 continuously urges the relatively slidable member 42 to the right as viewed in Fig. 2 and continuously resists longitudinal relative movement between the relatively slidable member 42 and the female coupling member 12 with a force directly proportional to the desired overload force. That is, the strength of the spring 47 is determined by the overload force it is desired to have the coupling members 11, 12 separate.

Slidably carried by member 42 is a plunger stop means which includes a longitudinally disposed pin 48 having one end 49 adapted to extend into the axial bore 50 and abut a portion 65 of each plunger 37 when they are in their latched position. A relatively light spring 51 abuts the other end 52 of the pin 48 to continuously urge the pin to the right as viewed in Fig. 2 or into abutting relationship with the plungers 37. The pin 48 is provided with a transversely extending aperture 53 adjacent the end 52. Positioned within a transversely extending aperture 54 formed in the relatively slidable member 42 is an actuating member 55. The actuating member 55 has a portion 56 projecting from the slidable member 42 which is conveniently engageable with the hand of the farmer or other person using the overload release coupling. A portion 57 of smaller diameter than portion 56 extends through the aperture 53. It will be noted that the diameter of portion 56 is considerably less than the diameter of the aperture 53 and thus the spring 51 normally urges interior surface 58 of the aperture 53 against only a part 59 of the portion 57. A conical camming portion 60 rigidly joins the portions 56 and 57 and a spring 61 resiliently urges the actuating member 55 outwardly. It will be apparent from the foregoing description that pin 48 may be moved out of abutting engagement with the plungers 37 independently of any longitudinal relative movement of the relatively slidable member 42 with respect to the female member 12. The actuating member 55 may be depressed causing the conical portion 60 to cam the pin 48 to the left, as viewed in Fig. 2, against the resilient action of spring 51. Following the removal of the pin 48 from its abutting relationship with the plungers 37, a slight pull between the male and female members 11 and 12 will cause the plungers 37 to be retracted into the male member 11 and the separation of the coupling members.

In operation, the male member 11 is connected to a farm implement or other device to be pulled and the relatively slidable member 42 together with the female member 12 which is resiliently connected to it is attached to the farm tractor or other draft means. The male member 11 is positioned within the female member and moved longitudinally until the plungers 37 in their retracted position abut the pin 48. The pin 48 is then moved a slight longitudinal distance to the left, as viewed in Fig. 2, to allow the plungers 37 to extend into the recess or groove 30. Inasmuch as the spring 51 is relatively weak as compared to the spring 47 only a small amount of the assembly force is needed to position the male member 11 within the female member 12 in their coupled relationship. When the plungers 37 have assumed their extended or latched position the spring 51 forces the pin 28 toward the plungers 37 whereby the end 49 abuts portions 50 of the plungers 37 to latch or lock the coupling members 11, 12 together.

The coupling device is disassembled or decoupled intentionally as described above or automatically when subjected to a force tending to separate the male and female members 11, 12 having a magnitude which exceeds the load it is desired to have transmitted between the members. It will be apparent that when the overload force is reached the relatively slidable member 42 will move relatively to the female member 12 compressing the spring 47. Since relative movement of the relatively slidable member 42 of necessity entails movement of the actuating member 55, it will be appreciated that the pin 48 also moves longitudinally away from the plungers 37 to allow retraction of the plungers and subsequently a separation of the male and female coupling members 11, 12.

It will be noted that the stresses resulting from the pressures within the hydraulic couplings 20, 21 are not transmitted to the spring 47 which is preloaded when the relatively slidable member 42 is assembled on the female member 12.

The embodiment of the invention chosen for the purposes of illustration and description herein is that preferred as a result of selective tests based upon the objects of the invention and developing the utility thereof in the most desirable manner, due regard being had to existing factors of economy, simplicity of design, and the improvements sought to be effected. It will be appreciated therefore that the particular structural and functional aspects emphasized herein are not intended to exclude, but rather to suggest such other adaptations and modifications of the invention as fall within the spirit and scope of the invention as defined in the appended claims.

What is claimed is:

1. An overload release coupling device comprising a male member detachably connected to a female member, said male member having an insertable portion adapted to be embraced by said female member; latch means carried by said insertable portion, said latch means including a plurality of radially projecting spring-pressed plungers adapted to protrude from said insertable portion to a latched position and to be retracted within said insertable portion to an unlatched position; a latch shoulder carried by said female member and engageable by said latch means when said male and female members are assembled in longitudinal alignment and said latch means is in said latched position, said latch shoulder being a wall of a substantially channel-shaped internal annular recess; latch controlling means cooperable with said male and female members movable longitudinally relatively to said male and female members from a first position wherein said latch means is prevented from moving to said unlatched position to a second position wherein said latch means is allowed to assume said unlatched position, said latch controlling means including a relatively slidable member having a hollow portion adapted to embrace said female member and plunger stop means adapted to abut a portion of each of said plungers when said latch controlling means is in said first position, said plunger stop means including a spring-pressed longitudinally disposed pin adapted to project into said male member; yieldable means for urging said latch controlling means to said first position, said yieldable means being overcome upon a direct longitudinal pull of a predetermined amount; and means for moving said plunger stop means to said second position independently of any relative movement of said relatively slidable member.

2. An overload release coupling device comprising a male member detachably connected to a female member, said male member having an insertable portion adapted to be embraced by said female member; latch means carried by said insertable portion, said latch means including a plurality of radially projecting spring-pressed plungers adapted to protrude from said insertable portion to a latched position and to be retracted within said insertable portion to an unlatched position; a latch shoulder carried by said female member and engageable by said latch means when said male and female members are assembled in longitudinal alignment and said latch means is in said latched position, said latch shoulder being a wall of a substantially channel-shaped internal annular recess; latch controlling means cooperable with said male and female members movable longitudinally relatively to said male and female members from a first position wherein said latch means is prevented from moving to said unlatched position to a second position wherein said latch means is allowed to assume said unlatched position, said latch controlling means including a relatively slidable member having a hollow portion adapted to embrace said female member and plunger stop means adapted to abut a portion of each of said plungers when said latch controlling means is in said first position, said plunger stop means including a longitudinally disposed pin adapted to project into said male member; and yieldable means for urging said latch controlling means to said first position, said yieldable means being overcome upon a direct longitudinal pull of a predetermined amount.

3. An overload release coupling device comprising a male member detachably connected to a female member, said male member having an insertable portion adapted to be embraced by said female member; latch means carried by said insertable portion, said latch means including a plurality of radially projecting spring-pressed plungers adapted to extend from said insertable portion to a latched position and to be retracted within said insertable portion to an unlatched position; a latch shoulder carried by said female member and engageable by said latch means when said male and female members are assembled in longitudinal alignment and said latch means is in said latched position, said latch shoulder being a wall of a substantially channel-shaped internal annular recess; latch controlling means cooperable with said male and female members movable longitudinally relatively to said male and female members from a first position wherein said latch means is prevented from moving to said unlatched position to a second position wherein said latch means is allowed to assume said unlatched position, said latch controlling means including a member having a hollow cylindrical portion adapted to embrace said female member, and plunger stop means adapted to abut a portion of each of said plungers when said latch controlling means is in said first position; and yieldable means for urging said latch controlling means to said first position, said yieldable means being overcome upon a direct longitudinal pull of a predetermined amount.

4. An overload release coupling device comprising a male member detachably connected to a female member, said male member having an insertable portion adapted to be embraced by said female member; latch means carried by said insertable portion, said latch means including a plurality of radially projecting spring-pressed plungers; a latch shoulder integrally formed on said female member and engageable by said latch means when said male and female members are assembled in longitudinal alignment, said latch shoulder being one wall of a substantially channel-shaped internal annular recess formed in said female member; latch controlling means cooperable with said male and female members for allowing disengagement of said latch means from said latch shoulder and separation of said male and female members, said latch controlling means including a member having a hollow cylindrical portion adapted to embrace said female member and move relatively in a longitudinal direction with respect to said male and female members to permit disengagement; and yieldable means restraining said latch controlling means from moving longitudinally with respect to said male and female members, said yieldable means being overcome upon a direct longitudinal pull of a predetermined amount to permit disengagement of said latch means from said latch shoulder whereby said male and female members may be separated.

5. An overload release coupling device comprising a male member detachably connected to a female member, said male member having an insertable portion adapted to be embraced by said female member; latch means carried by said insertable portion, said latch means including a plurality of radially projecting spring-pressed plungers; a latch shoulder integrally formed on said female member and engageable by said latch means when said male and female members are assembled in longitudinal alignment, said latch shoulder being one wall of a substantially channel-shaped internal annular recess formed in said female member; sleeve-like latch controlling means cooperable with said male and female members for allowing disengagement of said latch means from said latch shoulder and separation of said male and female members, said latch controlling means being disposed about said male and female members and being relatively movable in a longitudinal direction with respect to said male and female members to permit disengagement; and yieldable means restraining said latch controlling means from moving longitudinally with respect to said male and female members, said yieldable means being overcome upon a direct longitudinal pull of a predetermined amount to permit disengagement of said latch means from said latch shoulder whereby said male and female members may be separated.

6. An overload release coupling device comprising a male member detachably connected to a female member, said male member having an insertable portion adapted to be embraced by said female member; latch means carried by said insertable portion, a latch shoulder integrally formed on said female member and engageable by said latch means when said male and female members are assembled in longitudinal alignment; said latch shoulder being a wall of a substantially channel-shaped internal annular recess formed in said female member; sleeve-like latch controlling means cooperable with said male and female members for allowing disengagement of said latch means from said latch shoulder and separation of said male and female members, said latch controlling means being disposed about said male and female members and being relatively movable in a longitudinal direction with respect to said male and female members to permit disengagement; and yieldable means restraining said latch controlling means from moving longitudinally with respect to said male and female members, said yieldable means being overcome upon a direct longitudinal pull of a predetermined amount to permit disengagement of said latch means from said latch shoulder whereby said male and female members may be separated.

7. A coupling comprising separable male and female members; latch means carried by said male member; a latch shoulder integrally formed on said female member and engageable by said latch means when said male and female members are assembled in longitudinal alignment; sleeve-like latch controlling means cooperable with said male and female members for allowing disengagement of said latch means from said latch shoulder and separation of said male and female members, said latch controlling means being relatively movable in a longitudinal direction with respect to said male and female members to permit disengagement; and yieldable means restraining said latch controlling means from moving longitudinally with respect to said male and female members, said yieldable means being overcome upon a direct longitudinal pull of a predetermined amount to permit disengagement of said latch means from said latch shoulder whereby said male and female members may be separated; and independent releasing means for permitting disengagement of said male and female members without overcoming said yieldable means.

8. A coupling comprising separable male and female members; latch means carried by one of said members; a latch shoulder integrally formed on the other of said members and engageable by said latch means when said male and female members are assembled in longitudinal alignment; sleeve-like latch controlling means associated with said male and female members for allowing disengagement of said latch means from said latch shoulder, said latch controlling means being relatively movable in a longitudinal direction with respect to said male and female members to permit disengagement; and yieldable means restraining said latch controlling means from moving longitudinally with respect to said male and female members, said yieldable means being overcome upon a direct longitudinal pull of a predetermined amount to permit disengagement of said latch means from said latch shoulder whereby said male and female members may be separated and means independent of relative movement of said latch controlling means with respect to said male and female members for permitting disengagement of said members.

9. A coupling comprising separable male and female members; latch means carried by one of said members; a latch shoulder integrally formed on the other of said members and engageable by said latch means when said male and female members are assembled in longitudinal alignment; latch controlling means associated with said male and female members for allowing disengagement of said latch means from said latch shoulder, said latch controlling means being adapted to embrace said female member and being relatively movable with respect to said male and female members to permit disengagement; and yieldable means restraining said latch controlling means from moving relatively with respect to said male and female members, said yieldable means being overcome upon a direct longitudinal pull of a predetermined amount on said male and female members tending to separate them.

10. The coupling as set forth in claim 9 in which means are provided for permitting disengagement of said male and female members independently of any pull tending to separate said male and female members.

11. The overload release coupling device as set forth in claim 3 in which independent actuating means are provided to move said plunger stop means to said second position.

12. The overload release coupling device as set forth in claim 2 in which independent actuating means are provided to move said pin to said first position, said means including a vertically disposed actuating member slidably carried by said slidable member adapted to extend through an aperture in said pin, said actuating member having a camming portion engageable with said pin for moving said pin longitudinally upon vertical depression of said actuating member.

13. An overload release coupling device comprising a male element detachably connected to a female element, said male element having a portion insertable in said female element; latch means carried by said male element for latching said female element to said male element, said means including a plurality of radially projecting spring-pressed plungers adapted to extend into an internal annular recess formed in said female element; slidable stop means adapted to project into said male element and normally prevent retraction of said plungers, said stop means comprising a member having one end adapted to abut a portion of each of said plungers; means to allow retraction of said plungers including a relatively slidable member having a sleeve portion embracing said female element, said slidable member being operatively connected to said stop means whereby longitudinal movement of said relatively slidable member with respect to said female member in one direction allows retraction of said plungers; spring means opposing relative movement of said relatively slidable member with respect to said female member; and additional means for allowing retraction of said plungers entirely independent of the relative movement of said relatively slidable member.

EDMUND JEDRZYKOWSKI.

REFERENCES CITED

The following references are of record in the file of this patent:

UNITED STATES PATENTS

| Number | Name | Date |
| --- | --- | --- |
| 1,384,001 | Splittstoesser | July 5, 1921 |
| 1,677,009 | Wiltsie | July 10, 1928 |
| 1,850,310 | Ainslie | Mar. 22, 1932 |
| 2,102,722 | Kortering | Dec. 21, 1937 |
| 2,444,919 | Cotton et al. | July 13, 1948 |